(12) United States Patent
Yamada et al.

(10) Patent No.: US 6,842,734 B2
(45) Date of Patent: Jan. 11, 2005

(54) METHOD AND APPARATUS FOR PRODUCING ACOUSTIC MODEL

(75) Inventors: Maki Yamada, Kawasaki (JP); Masakatsu Hoshimi, Zama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 772 days.

(21) Appl. No.: 09/879,932

(22) Filed: Jun. 14, 2001

(65) Prior Publication Data

US 2002/0055840 A1 May 9, 2002

(30) Foreign Application Priority Data

Jun. 28, 2000 (JP) ........................................ 2000-194196

(51) Int. Cl.[7] .......................... G10L 15/06; G10L 15/20
(52) U.S. Cl. ........................ 704/245; 704/243; 704/233
(58) Field of Search ............................... 704/226, 233, 704/234, 243, 245

(56) References Cited

U.S. PATENT DOCUMENTS

| | | | |
|---|---|---|---|
| 4,590,605 A | | 5/1986 | Hataoka et al. |
| 5,806,029 A | * | 9/1998 | Buhrke et al. .............. 704/244 |
| 6,782,361 B1 | * | 8/2004 | El-Maleh et al. ........... 704/226 |

FOREIGN PATENT DOCUMENTS

| | | |
|---|---|---|
| CN | 1199488 | 11/1998 |
| DE | 43 25 404 A1 | 2/1995 |
| JP | 10-232694 | 9/1998 |
| WO | WO 99/40571 | 8/1999 |

OTHER PUBLICATIONS

Schultz et al.; Acoustic and Language Modeling of Human and Nonhuman Noise for Human–to–human Spontaneous Speech Recognition; IEEE 1995, pp. 293–296.*

"Evaluation of the Phoneme Recognition System for Noise mixed Data" by M. Hoshimi et al.; The Lecture Journal of the Acoustical Society of Japan; Mar., 1988; pp., 263–264 (w/Partial English translation).

Lee, "On Stochastic Feature and Model Compensation Approaches to Robust Speech Recognition", Speech Communication, 1998, vol. 25, pps. 29–47.

Moreno et al., "Data–driven Environmental Compensation for Speech Recognition: A Unified Approach", Speech Communication, 1998, vol. 24, pps. 267–285.

* cited by examiner

Primary Examiner—Abul K. Azad
(74) Attorney, Agent, or Firm—Connolly Bove Lodge & Hutz LLP (57) ABSTRACT

In an acoustic model producing apparatus, a plurality of noise samples are categorized into clusters so that a number of the clusters is smaller than that of noise samples. A noise sample is selected in each of the clusters to set the selected noise samples to second noise samples for training. On the other hand, untrained acoustic models are stored on a storage unit so that the untrained acoustic models are trained by using the second noise samples for training, thereby producing trained acoustic models for speech recognition so as to produce a trained acoustic model for speech recognition.

8 Claims, 9 Drawing Sheets

| NOISE SAMPLE | NAME | REMARK |
|---|---|---|
| NO1 | RIVER | MUMURS OF RIVER |
| NO2 | MUSIC | POPS |
| NO3 | MARK II | NOISES AT TIME OF DRIVING |
| NO4 | COROLLA | NOISES AT TIME OF DRIVING |
| NO5 | ESTIMA | NOISES AT TIME OF DRIVING |
| NO6 | MAJESTA | NOISES AT TIME OF DRIVING |
| NO7 | PORTOPIA HALL | NOISES IN PORTOPIA HALL |
| NO8 | DATA SHOW HALL | NOISES IN DATA SHOW HALL |
| NO9 | SUBWAY | NOISES IN SUBWAY |
| NO10 | DEPARTMENT | NOISES IN DEPARTMENT |
| NO11 | BUSINESS OFFICE | NOISES IN BUSINESS OFFICE |
| NO12 | LABORATORY | NOISES IN LABORATORY |
| NO13 | BUZZ-BUZZ | EFFECTIVE SOUND BY CD |
| NO14 | OFFICE | NOISES IN OFFICE |
| NO15 | STREET FACTORY | RORATY PRESS |
| NO16 | KINDERGARTEN | NOISES IN KINDERGARTEN |
| NO17 | TOKYO STATION | NOISES IN YAES CENTRAL ENTRANCE OF TOKYO |

METHOD AND APPARATUS FOR PRODUCING ACOUSTIC MODEL

BACKGROUND OF THE INVENTION

1. Field of the Invention

The present invention relates to a method and an apparatus for producing an acoustic model for speech recognition, which is used for obtaining a high recognition rate in a noisy environment.

2. Description of the Prior Art

In a conventional speech recognition in a noisy environment, noise data are superimposed on speech samples and, by using the noise superimposed speech samples, untrained acoustic models are trained to produce acoustic models for speech recognition, corresponding to the noisy environment, as shown in "Evaluation of the Phoneme Recognition System for Noise mixed Data", Proceedings of the Conference of the Acoustical Society of Japan, 3-P-8, March 1988.

Figure 10:
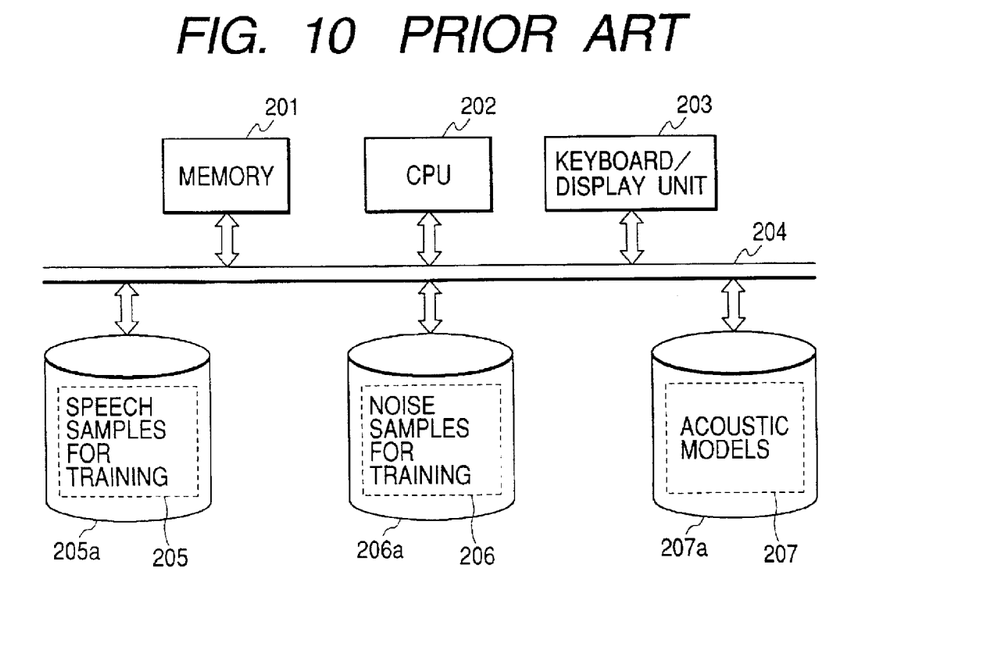
FIG. 10 is a structural view showing a conventional acoustic model producing apparatus.
Figure 11:
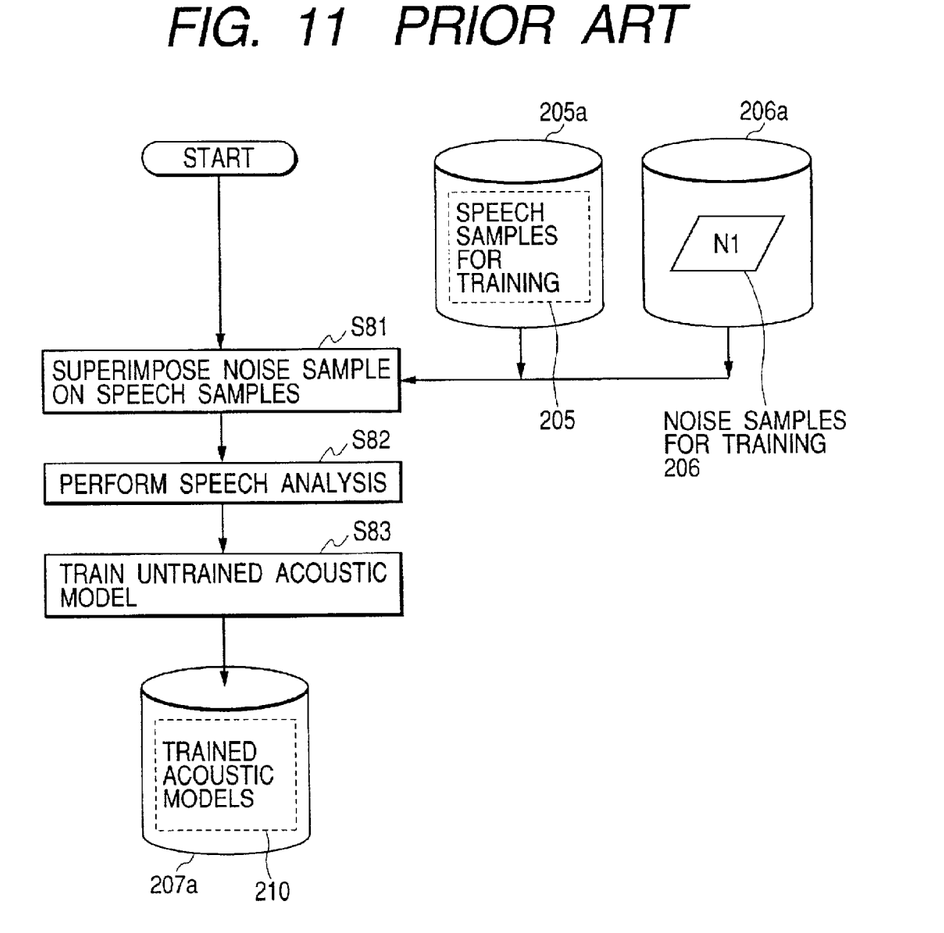
FIG. 11 is a flowchart showing conventional acoustic model producing operations by the speech recognition apparatus shown in FIG.

A configuration of a conventional acoustic model producing apparatus which performs the conventional speech recognition is shown in FIG. 10.

Figure 8:
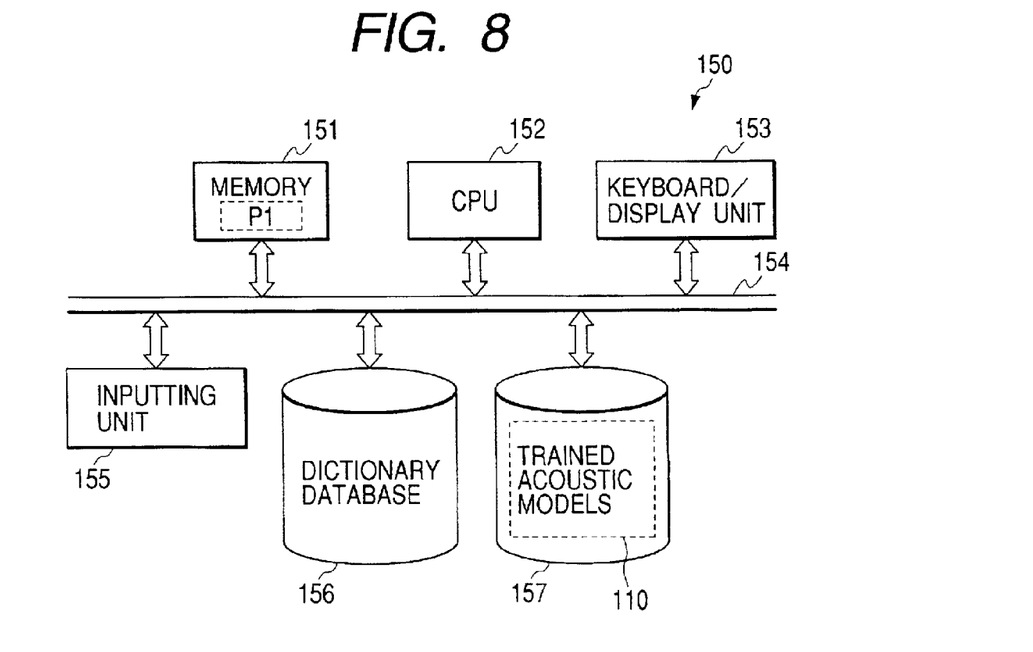
FIG. 8 is a structural view of a speech recognition apparatus according to a second embodiment of the present invention.

In the acoustic model producing apparatus shown in FIG. 8, reference numeral 201 represents a memory, reference numeral 202 represents a CPU (central processing unit) and reference numeral 203 represents a keyboard/display. Moreover, reference numeral 204 represents a CPU bus through which the memory 201, the CPU 202 and the keyboard/display 203 are electrically connected to each other.

Furthermore, reference numeral 205a is a storage unit on which speech samples 205 for training are stored, reference numeral 206a is a storage unit on which a kind of noise sample for training is stored and reference numeral 207 a is a storage unit for storing thereon untrained acoustic models 207, these storage units 205a–207a are electrically connected to the CPU bus 204 respectively.

The acoustic model producing processing by the CPU 202 is explained hereinafter according to a flowchart shown in FIG. 9.

Figure 9:
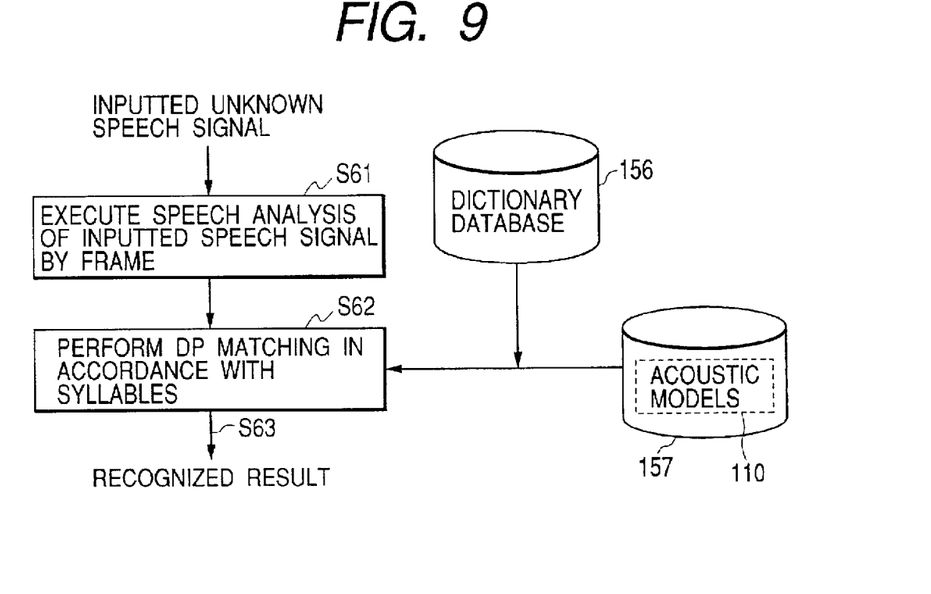
FIG. 9 is a flowchart showing speech recognition operations by the speech recognition apparatus according to the second embodiment.

In FIG. 9, reference characters S represent processing steps performed by the CPU 202.

At first, the CPU 202 reads the speech samples 205 from the storage unit 205a and the noise sample 206 from the storage unit 206a, and the CPU 202 superimposes the noise sample 206 on the speech samples 205 (Step S81), and performs a speech analysis of each of the noise superimposed speech samples by predetermined time length (Step S82).

Next, the CPU 202 reads the untrained acoustic models 207 from the storage unit 207 to train the untrained acoustic models 207 on the basis of the analyzed result of the speech analysis processing, thereby producing the acoustic models 210 corresponding to the noisy environment (Step S83). Hereinafter, the predetermined time length is referred to frame, and then, the frame corresponds to ten millisecond.

Then, the one kind of noise sample 206 is a kind of data that is obtained based on noises in a hall, in-car noises or the like, which are collected for tens of seconds.

According to this producing processing, when performing the training operation of the untrained acoustic models on the basis of the speech samples on which the noise sample is superimposed, it is possible to obtain a comparatively high recognition rate.

However, the noise environment at the time of speech recognition is usually unknown so that, in the described conventional producing processing, in cases where the noise environment at the time of speech recognition is different from the noise environment at the time of training operation of the untrained acoustic models, a problem in that the recognition rate is deteriorated arises.

In order to solve the problem, it is attempted to collect all noise samples which can exist at the time of speech recognition, but it is impossible to collect these all noise samples.

Then, actually, by supposing a large number of noise samples which can exist at the time of speech recognition, it is attempted to collect the supposed noise samples so as to perform the training operation.

However, it is inefficient to train the untrained acoustic models on the basis of all of the collected noise samples because of taking an immense amount of time. In addition, in cases where the large number of collected noise samples have characteristics which are offset, even in the case of training the untrained acoustic models by using the noise samples having the offset characteristics, it is hard to widely recognize unknown noises which are not associated with the offsetted characteristics.

SUMMARY OF THE INVENTION

The present invention is directed to overcome the foregoing problems. Accordingly, it is an object of the present invention to provide a method and an apparatus for producing an acoustic model, which are capable of categorizing a plurality of noise samples which can exist at the time of speech recognition into a plurality of clusters to select a noise sample from each cluster, and of superimposing the selected noise samples, as noise samples for training, on speech samples for training to train an untrained acoustic model based on the noise superimposed speech samples, thereby producing the acoustic model.

According to this method and system, it is possible to perform a speech recognition by using the produced acoustic model, thereby obtaining a high recognition rate in any unknown noise environments.

BRIEF DESCRIPTION OF THE DRAWINGS

Other objects and aspects of the present invention will become apparent from the following description of an embodiment with reference to the accompanying drawings in which.

DETAILED DESCRIPTION OF THE PREFERRED EMBODIMENTS (1) Description of the Aspect of the Invention According to one aspect of the present invention, there is provided an apparatus for producing an acoustic model for speech recognition, said apparatus comprising: means for categorizing a plurality of first noise samples into clusters, a number of said clusters being smaller than that of noise samples; means for selecting a noise sample in each of the clusters to set the selected noise samples to second noise samples for training; means for storing thereon an untrained acoustic model for training; and means for training the untrained acoustic model by using the second noise samples for training so as to produce the acoustic model for speech recognition.

According to another aspect of the present invention, there is provided a method of producing an acoustic model for speech recognition, said method comprising the steps of: preparing a plurality of first noise samples; preparing an untrained acoustic model for training; categorizing the plurality of first noise samples into clusters, a number of said clusters being smaller than that of noise samples; selecting a noise sample in each of the clusters to set the selected noise samples to second noise samples for training; and training the untrained acoustic model by using the second noise samples for training so as to produce the acoustic model for speech recognition.

According to a further aspect of the present invention, there is provided a programmed-computer readable storage medium comprising: means for causing a computer to categorize a plurality of first noise samples into clusters, a number of said clusters being smaller than that of noise samples; means for causing a computer to select a noise sample in each of the clusters to set the selected noise samples to second noise samples for training; means for causing a computer to store thereon an untrained acoustic model; and means for causing a computer to train the untrained acoustic model by using the second noise samples for training so as to produce an acoustic model for speech recognition.

In these aspects of the present invention, because of categorizing the plurality of first noise samples corresponding to a plurality of noisy environments into clusters so as to select a noise sample in each of the clusters, thereby training the untrained acoustic model on the basis of each of the selected noise samples, thereby producing the trained acoustic model for speech recognition, it is possible to train the untrained acoustic model by using small noise samples and to widely cover many kinds of noises which are not offset, making it possible to produce the trained acoustic model for speech recognition capable of obtaining a high recognition rate in any unknown environments.

According to a still further aspect of the present invention, An apparatus for recognizing an unknown speech signal comprising: means for categorizing a plurality of first noise samples into clusters, a number of said clusters being smaller than that of noise samples; means for selecting a noise sample in each of the clusters to set the selected noise samples to second noise samples for training; means for storing thereon an untrained acoustic model for training; means for training the untrained acoustic model by using the second noise samples for training so as to obtain a trained acoustic model for speech recognition; means for inputting the unknown speech signal; and means for recognizing the unknown speech signal on the basis of the trained acoustic model for speech recognition.

In this further aspect of the present invention, because of using the above trained acoustic model for speech recognition on the basis of the plurality of noise samples, it is possible to obtain a high recognition rate in noisy environments.

(2) Description of the Preferred Embodiments

The preferred embodiments of the present invention will be described hereinafter with reference to the accompanying drawings.

(First Embodiment)

Figure 1:
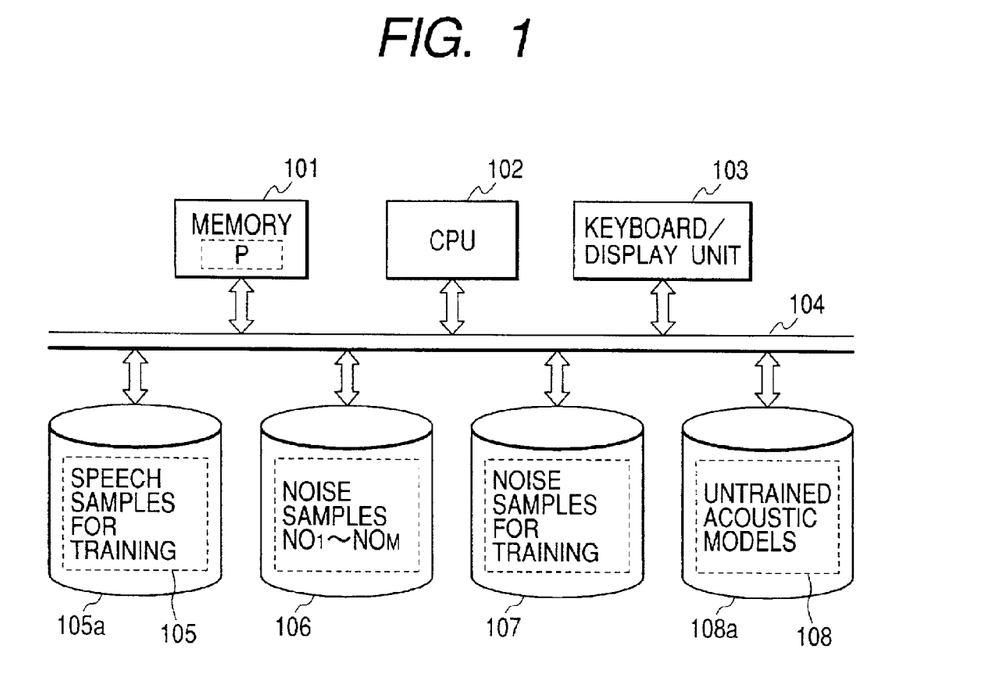
FIG. 1 is a structural view of an acoustic model producing apparatus according to a first embodiment of the present invention.

FIG. 1 is a structural view of an acoustic model producing apparatus 100 according to a first embodiment of the present invention.

In FIG. 1, the acoustic model producing apparatus 100 which is configured by at least one computer comprises a memory 101 which stores thereon a program P, a CPU 102 operative to read the program P and to perform operations according to the program P.

The acoustic model producing apparatus 100 also comprises a keyboard/display unit 103 for inputting data by an operator to the CPU 102 and for displaying information based on data transmitted therefrom and a CPU bus 104 through which the memory 101, the CPU 102 and the keyboard/display unit 103 are electrically connected so that data communication are permitted with each other.

Moreover, the acoustic model producing apparatus 100 comprises a first storage unit 105a on which a plurality of speech samples 105 for training are stored, a second storage unit 106 on which a plurality of noise samples $NO_1$, $NO_2$, . . . , $NO_M$ are stored, a third storage unit 107 for storing thereon noise samples for training, which are produced by the CPU 102 and a fourth storage unit 108a which stores thereon untrained acoustic models 108. These storage units are electrically connected to the CPU bus 104 so that the CPU 102 can access from/to these storage units.

Figure 2:
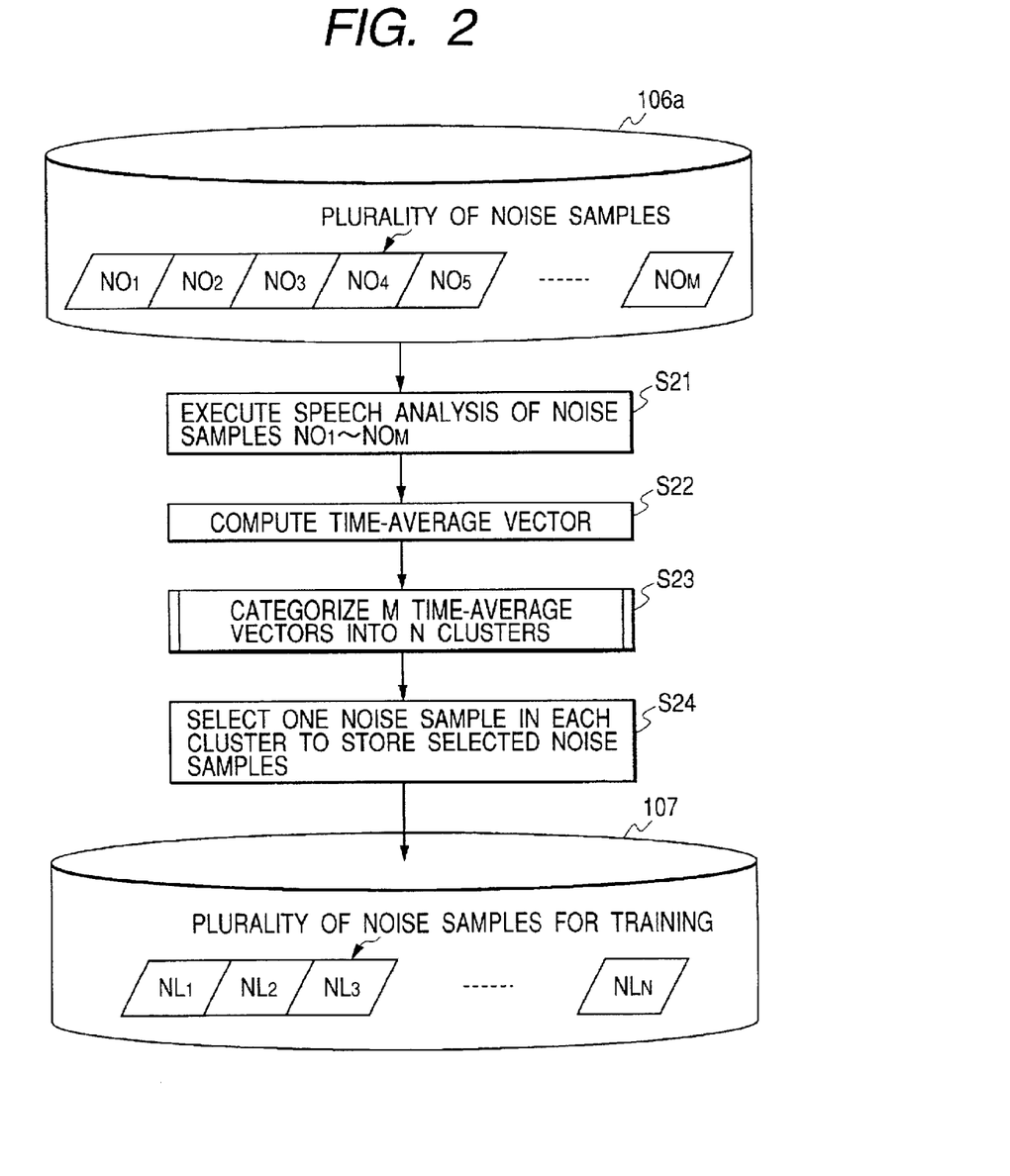
FIG. 2 is a flowchart showing operations by the acoustic model producing apparatus according to the first embodiment.
Figure 6:
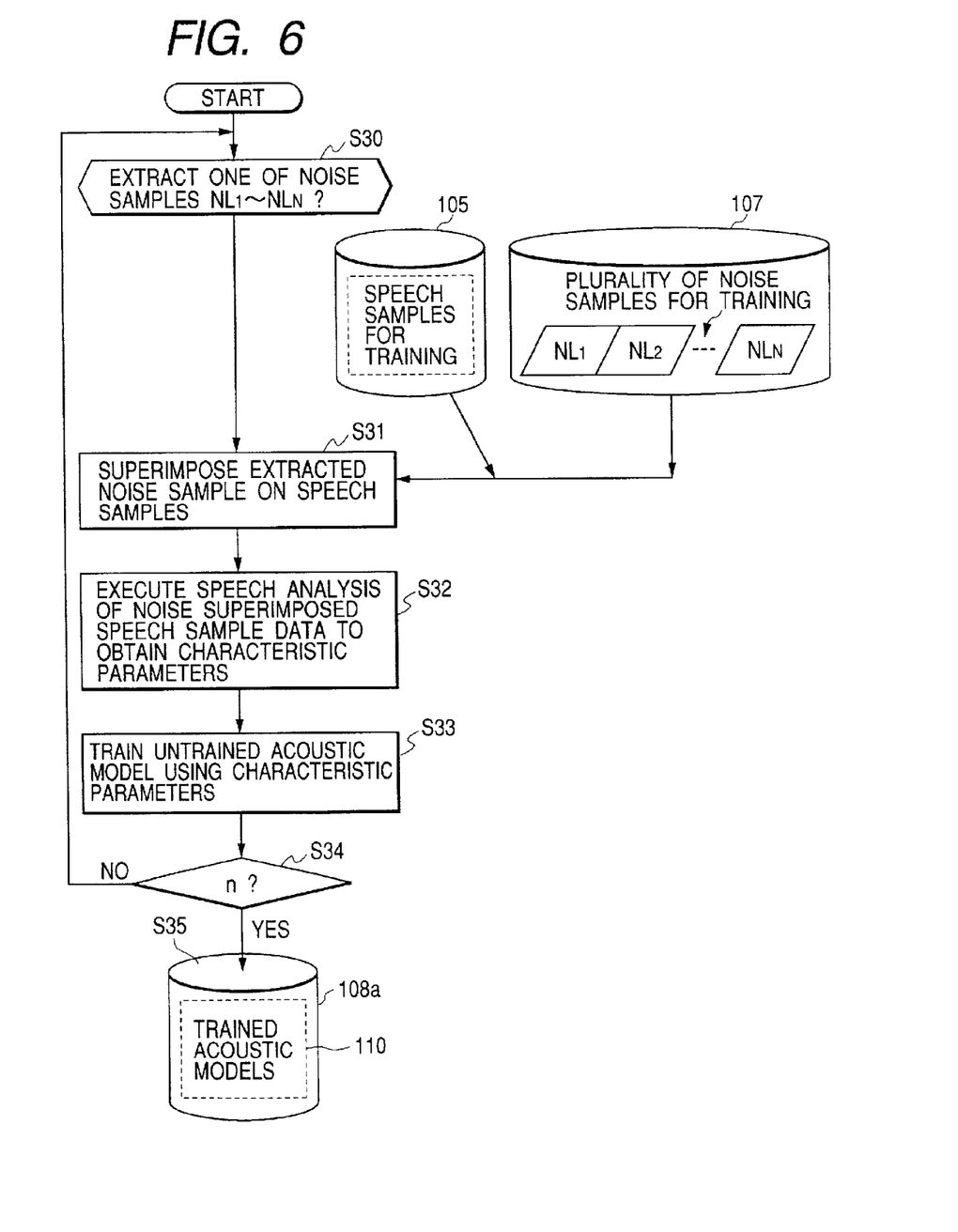
FIG. 6 is a flowchart showing producing operations for acoustic models by the acoustic model producing apparatus according to the first embodiment.

In this first embodiment, the CPU 102, at first, executes selecting operations based on the program P according to a flowchart shown in FIG. 2, and next, executes acoustic model producing operations based on the program P according to a flowchart shown in FIG. 6.

That is, the selecting operations of noise samples for training by the CPU 102 are explained hereinafter according to FIG. 2.

That is, as shown in FIG. 2, the plurality of noise samples $NO_1$, $NO_2$, . . . , $NO_M$ which correspond to a plurality of noisy environments are previously prepared as many as possible to be stored on the second storage unit 106. Incidentally, in this embodiment, a number of noise samples is, for example, M.

The CPU 102 executes a speech analysis of each of the noise samples $NO_1$, $NO_2$, . . . , $NO_M$ by predetermined time length (predetermined section; hereinafter, referred to frame) so as to obtain k-order characteristic parameters for each of the flames in each of the noise samples $NO_1$, $NO_2$, . . . , $NO_M$ (Step S21).

In this embodiment, the frame (predetermined time length) corresponds to ten millisecond, and as the k-order characteristic parameters, first-order to seventh-order LPC (Linear Predictive Coding) cepstrum coefficients ($C_1$, $C_2$, ..., $C_7$) are used. These k-order characteristic parameters are called a characteristic vector.

Then, the CPU 102 obtains a time-average vector in each of the characteristic vectors of each of the noise samples $NO_1, NO_2, \ldots, NO_M$. As a result, M time-average vectors corresponding to the M noise samples $NO_1, NO_2, \ldots, NO_M$ are obtained (Step S22).

Next, the CPU 102, by using clustering method, categorizes (clusters) the M time-average vectors into N categories (clusters) (Step S23). In this embodiment, as the clustering method, a hierarchical clustering method is used.

That is, in the hierarchical clustering method, a distance between noise samples (time-average vectors) is used as a measurement of indicating the similarity (homogenization) between noise samples (time-average vectors). In this embodiment, as the measurement of the similarity between noise samples, an weighted Euclid distance between two time-average vectors is used. As other measurements of the similarity between noise samples, an Euclid distance, a general Mahalanobis distance, a Battacharyya distance which takes into consideration to a sum of products of samples and dispersion thereof and the like can be used.

In addition, in this embodiment, a distance between two clusters is defined to mean "a smallest distance (nearest distance) among distances formed by combining two arbitrary samples belonging the two clusters, respectively". The definition method is called "nearest neighbor method".

As a distance between two clusters, other definition methods can be used.

For example, as other definition methods, a distance between two clusters can be defined to mean "a largest distance (farthest distance) among distances formed by combining two arbitrary samples belonging to the two clusters, respectively", whose definition method is called "farthest neighbor method", to mean "a distance between centroids of two clusters", whose definition method is called "centroid method" and to mean "an average distance which is computed by averaging all distances formed by combining two arbitrary samples belonging to the two clusters, respectively", whose definition method is called "group average method".

Figure 3:
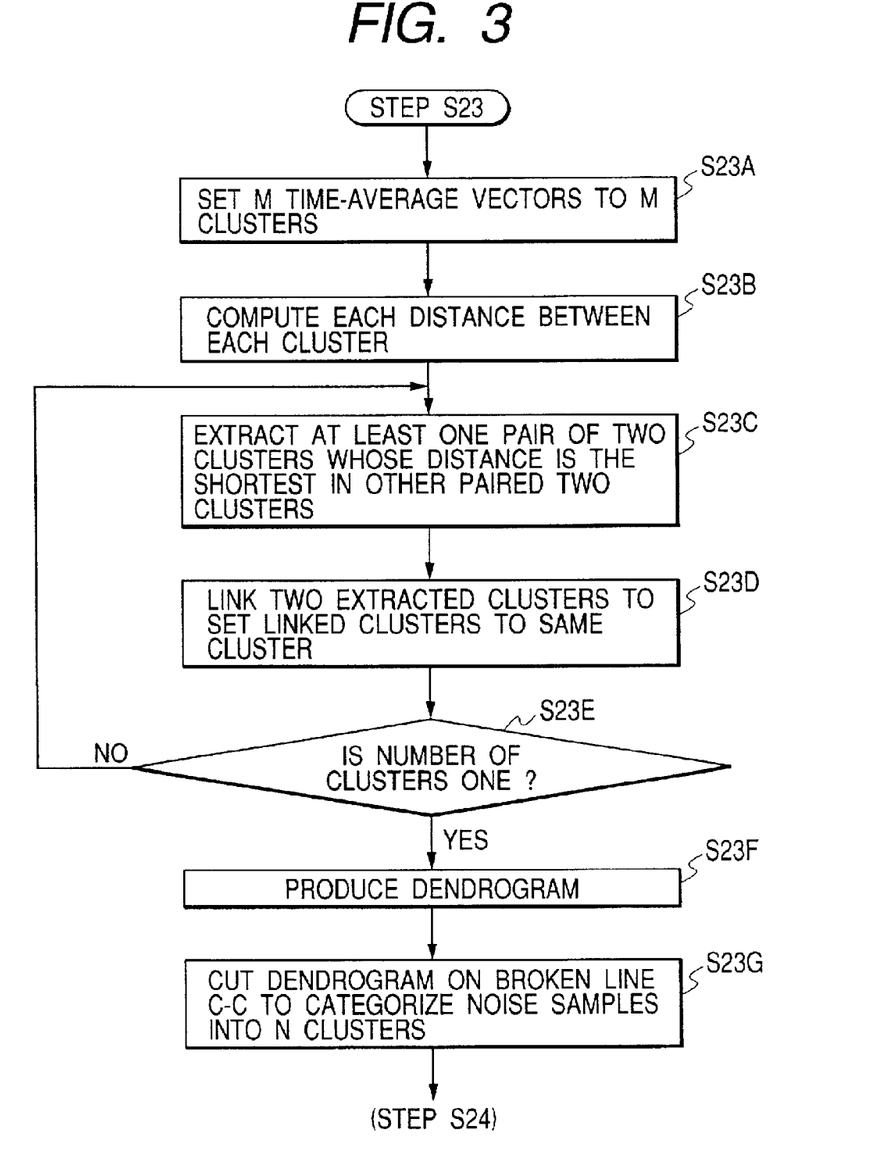
FIG. 3 is a flowchart detailedly showing operations in Step S23 of FIG. 1 according to the first embodiment.

That is, the CPU 102 sets the M time-average vectors to M clusters (FIG. 3; Step S23a), and computes each distance between each cluster by using the nearest neighbor method (Step S23b).

Next, the CPU 102 extracts at least one pair of two clusters providing the distance therebetween which is the shortest (nearest) in other any paired two clusters (Step S23c), and links the two extracted clusters to set the linked clusters to a same cluster (Step S23d).

The CPU 102 determines whether or not the number of clusters equals to one (Step S23e), and in a case where the determination in Step S23e is NO, the CPU 102 returns the processing in Step S23cso as to repeatedly perform the operations from Step S23cto S23eby using the linked cluster.

Then, in a case where the number of clusters is one so that the determination in Step S23eis YES, the CPU 102 produces a dendrogram DE indicating the similarities among the M noise samples $NO_1, NO_2, \ldots, NO_M$ on the basis of the linking relationship between the clusters (Step S23f).

Figure 4:
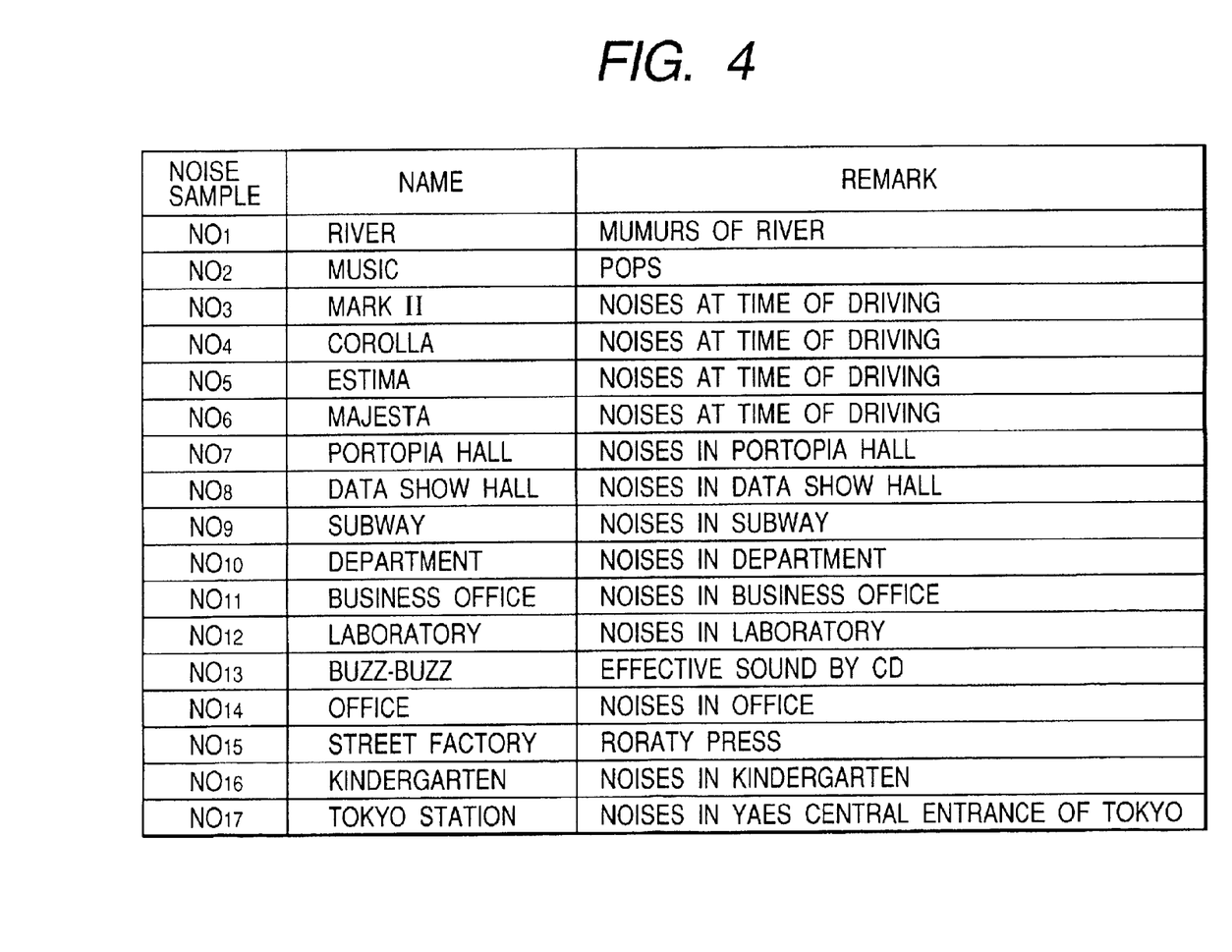
FIG. 4 is a view showing an example of noise samples according to the first embodiment.

In this embodiment, the number M is set to 17, so that, for example, the noise samples $NO_1$~$NO_{17}$ for 40 seconds are shown in FIG. 4.

In FIG. 4, each name of each noise sample and each attribute thereof as remark are shown. For example, the name of noise sample $NO_1$ is "RIVER" and the attribute thereof is murmurs of the river, and the name of noise sample $NO_{11}$ is "BUSINESS OFFICE" and the attribute thereof is noises in the business office.

Figure 5:
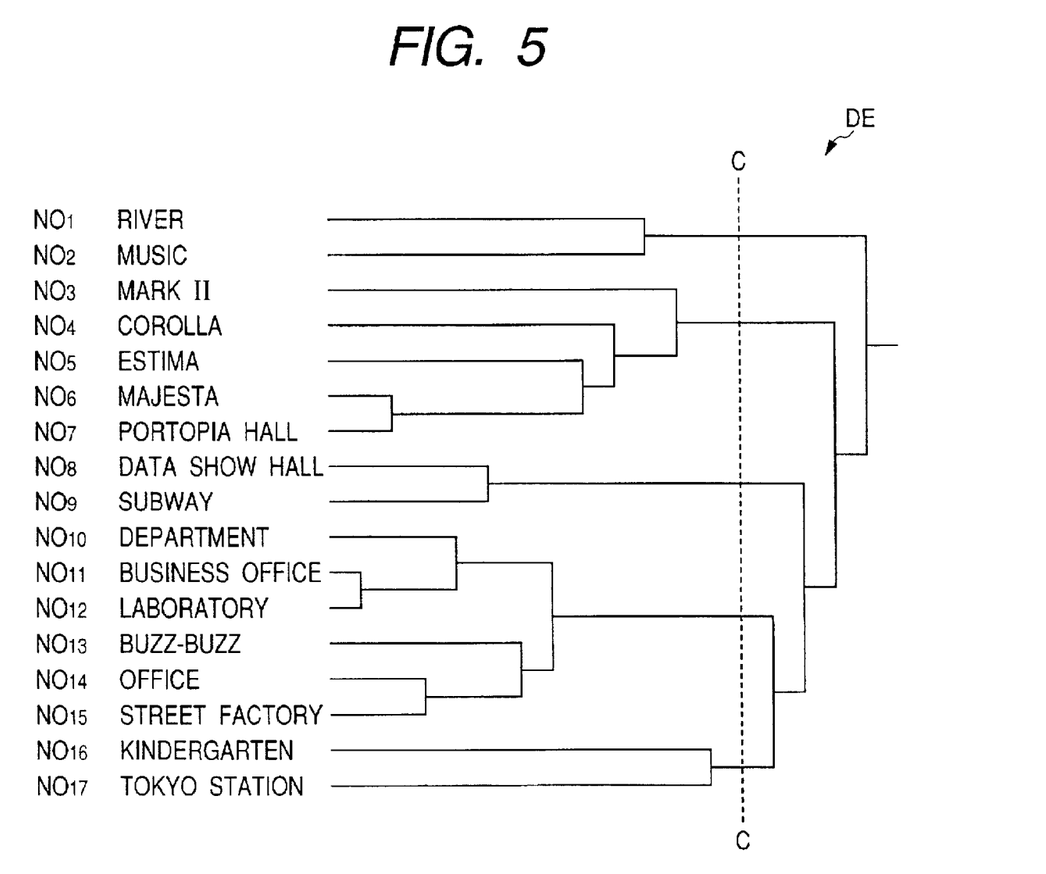
FIG. 5 is a view showing a dendrogram obtained by a result of operations in Steps S23a–S23f of FIG. 3.

FIG. 5 shows the dendrogram DE obtained by the result of the clustering operations in Steps S23a–S23f.

In the dendrogram DE shown in FIG. 5, the lengths in a horizontal direction therein indicate distances between each of the clusters and, when cutting the dendrogram DE at a given position thereof, the cluster is configured to a group of noise samples which are linked and related to one another.

That is, in this embodiment, the CPU 102 cuts the dendrogram DE at the predetermined position on a broken line C—C so as to categorize the noise samples $NO_1$~$NO_{17}$ into N (=5) clusters, wherein the N is smaller than the M (Step S23g).

As shown in FIG. 5, after cutting the dendrogram DE on the broken line C—C, because the noise samples $NO_1$ and $NO_2$ are linked to each other, the noise samples $NO_3$~$NO_5$ are linked to one another, the noise samples $NO_8$ and $NO_9$ are linked to each other, the noise samples $NO_{10}$~$NO_{12}$ are linked to one another, the noise samples $NO_{13}$~$NO_{15}$ are linked to one another and the noise samples $NO_{16}$ and $NO_{17}$ are linked to each other, so that it is possible to categorize the noise samples $NO_1 NO_{17}$ into N (=5) clusters.

That is, cluster 1~cluster 5 are defined as follows:

Cluster 1 {"noise sample $NO_1$ (RIVER)" and "noise sample $NO_2$ (MUSIC)"};

Cluster 2 {"noise sample $NO_3$ (MARK II)", "noise sample $NO_4$ (COROLLA)", "noise sample $NO_5$ (ESTIMA)", "noise sample $NO_6$ (MAJESTA)" and "noise sample $NO_7$ (PORTOPIA HALL)"};

Cluster 3 {"noise sample $NO_8$ (DATA SHOW HALL)" and "noise sample $NO_9$ (SUBWAY)"});

Cluster 4 {"noise sample $NO_{10}$ (DEPARTMENT)", "noise sample $NO_{11}$ (BUSINESS OFFICE)", "noise sample $NO_{12}$ (LABORATORY)", "noise sample $NO_{13}$ (BUZZ-BUZZ)", "noise sample $NO_{14}$ (OFFICE)") and "noise sample $NO_{15}$ (STREET FACTORY)"}; and Cluster 5 {"noise sample $NO_{16}$ (KINDERGARTEN)" and "noise sample $NO_{17}$ (TOKYO STATION"}.

After performing the Step S23 (S23a~S23g), the CPU 102 selects one arbitrary noise sample in each of the clusters 1~5 to set the selected noise samples to N number of noise samples (noise samples 1~N (=5)), thereby storing the selected noise samples as noise samples for training $NL_1$~$NL_n$ on the third storage unit 107 (Step S24). As a manner of selecting one noise sample in the cluster, it is possible to select one noise sample which is nearest to the centroid in the cluster or to select one noise sample in the cluster at random.

In this embodiment, the CPU 102 selects the noise sample $NO_1$ (RIVER) in the cluster 1, the noise sample $NO_3$ (MARK II) in the cluster 2, the noise sample $NO_8$ (DATA SHOW HALL) in the cluster 3, the noise sample $NO_{10}$ (DEPARTMENT) in the cluster 4 and the noise sample $NO_{16}$ (KINDERGARTEN), and set the selected noise samples $NO_1, NO_3, NO_8, NO_{10}$ and $NO_{16}$ to noise samples $NL_1, NL_2, NL_3, NL_4$ and $NL_5$ for training to store them on the third storage unit 107.

Secondary, the producing operations for acoustic models by the CPU 102 are explained hereinafter according to FIG. 6.

At first, the CPU 102 extracts one of the noise samples $NL_1$~$NL_N$ (N=5) for training from the third storage unit 107 (Step S30), and superimposes the extracted one of the noise samples $NL_1$~$NL_N$ on a plurality of speech samples 105 for training stored on the first storage unit 105a (Step S31).

In this embodiment, as the speech samples 105 for training, a set of phonological balanced words 543×80 persons is used.

Then, the superimposing manner in Step S31 is explained hereinafter.

The CPU 102 converts the speech samples 105 into digital signal S(i) (i=1, . . . , I) at a predetermined sampling frequency (Hz) and converts the extracted noise sample $NL_N$ (1≦n≦N) at the sampling frequency (Hz) into digital signal $N_n$ (i) (i=1, . . . , I). Next, the CPU 102 superimposes the digital signal $N_n$(i) on the digital signal S(i) to produce noise superimposed speech sample data $S_n$ (i) (i=1, . . . , I), which is expressed by an equation (1).

$$S_n(i)=S(i)+N_n(i) \tag{1}$$

Where i=1, . . . , I, and I is a value obtained by multiplying the sampling frequency by a sampling time of the data.

Next, the CPU 102 executes a speech analysis of the noise superimposed speech sample data $S_n$(i) by predetermined time length (frame) so as to obtain p-order temporally sequential characteristic parameters corresponding to the noise superimposed speech sample data (Step S32).

More specifically, in Step S32, the CPU 102 executes a speech analysis of the noise superimposed speech sample data by the frame so as to obtain, as p-order characteristic parameters, LPC cepstrum coefficients and these time regression coefficients for each frame of the speech sample data. Incidentally, in this embodiment, the LPC cepstrum coefficients are used, but FFT (Fast Fourier Transform) cepstrum coefficients, MFCC (Mel-Frequency Cepstrum Co-efficients), Mel-LPC cepstrum coefficients or the like can be used in place of the LPC cepstrum coefficients.

Next, the CPU 102, by using the p-order characteristic parameters as characteristic parameter vectors, trains the untrained acoustic models 108 (Step S33). In this embodiment, the characteristic parameter vectors consist of characteristic parameters per one frame, but the characteristic parameter vectors can consist of characteristic parameters per plural frames.

As a result of performing the operations in Step S31-S33, the acoustic models 108 are trained on the basis of the one extracted noise sample $NL_n$.

Then, the CPU 102 determines whether or not the acoustic models 108 are trained on the basis of all of the noise samples $NL_n·$(n=1~N) , and in a case where the determination in Step S34 is NO, the CPU 102 returns the processing in Step S31 so as to repeatedly perform the operations from Step S31 to S34.

In a case where the acoustic models 108 have been trained on the basis of all of the noise samples $NL_n·$(n=1~N) so that the determination in Step S34 is YES, the CPU 102 stores on the fourth storage unit 108a the produced acoustic models as trained acoustic models 110 which are trained on the basis of all of the noise samples $NL_n$ (Step S35).

As the acoustic models 108 for training, temporally sequential patterns of characteristic vectors for DP (Dynamic Programming) matching method, which are called standard patterns, stochastic models such as HMM (Hidden Markov Models) or the like can be used. In this embodiment, as the acoustic models 108 for training, the standard patterns for DP matching method are used. The DP matching method is an effective method capable of computing the similarity between two patterns while taking account scalings of time axes thereof.

As a unit of the standard pattern, usually a phoneme, a syllable, a demisyllable, CV/VC (Consonant+Vowel/ Vowel+Consonant) or the like are used. In this embodiment, the syllable is used as a unit of the standard pattern. The number of frames of the standard pattern is set to equal to that of the average syllable frames.

That is, in the training Step S33, the characteristic parameter vectors (the noise superimposed speech samples) obtained by Step S32 are cut by syllable, and the cut speech samples and the standard patterns are matched for each frame by using the DP matching method while considering time scaling, so as to obtain that the respective frames of each of the characteristic parameter vectors correspond to which frames of each the standard patterns.

Figure 7:
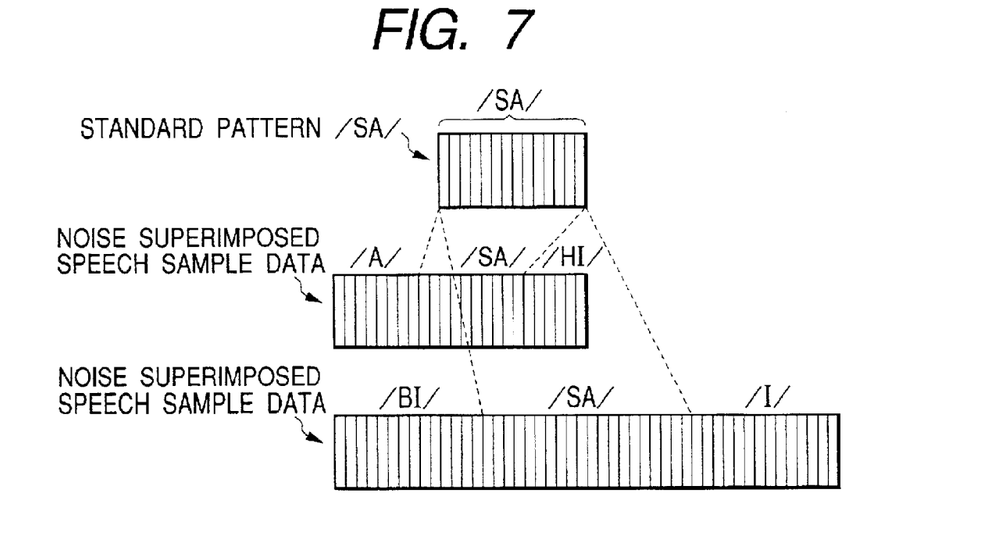
FIG. 7 is a view showing a conception of frame matching operations in Step S33 of FIG. 6.

FIG. 7 shows the frame matching operations in Step S33. That is, the characteristic parameter vectors (noise superimposed speech sample data) corresponding to "/A/ /SA/ /HI/", "/BI/ /SA/ /I/") and the standard pattern corresponding to "/SA/" are matched for syllable (/ /).

In this embodiment, assuming that each of the standard patterns (standard vectors) conforms to single Gaussian distribution, an average vector and covariance of each of the frames of each of the characteristic parameter vectors, which corresponds to each of the frames of each of the standard patterns, are obtained so that these average vector and the covariance of each of the frames of each of the standard patterns are the trained standard patterns (trained acoustic models). In this embodiment, the single Gaussian distribution is used, but mixture Gaussian distribution can be used.

The above training operations are performed on the basis of all of the noise samples $NL_n·$(n=1~N). As a result, finally, it is possible to obtain the trained acoustic models 110 trained on the basis of all of the noise samples $NL_n·$(n=1~N), that include the average vectors and the covariance matrix corresponding to the speech sample data on which the N noise samples are superimposed.

As described above, because of categorizing the plurality of noise samples corresponding to a plurality of noisy environments into clusters, it is possible to select one noise sample in each of the clusters so as to obtain the noise samples, which covers the plurality of noisy environments and the number of which is small.

Therefore, because of superimposing the obtained noise samples on the speech samples so as to train the untrained acoustic model on the basis of the noise superimposed speech sample data, it is possible to train the untrained acoustic model by using small noise samples and to widely cover many kinds of noises which are not offset, making it possible to produce a trained acoustic model capable of obtaining a high recognition rate in any unknown environments.

(Second Embodiment)

FIG. 8 is a structural view of a speech recognition apparatus 150 according to a second embodiment of the present invention.

The speech recognition apparatus 150 configured by at least one computer which may be the same as the computer in the first embodiment comprises a memory 151 which stores thereon a program P1, a CPU 152 operative to read the program P1 and to perform operations according to the program P1, a keyboard/display unit 153 for inputting data by an operator to the CPU 152 and for displaying information based on data transmitted therefrom and a CPU bus 154 through which the above components 151~153 are electrically connected so that data communication are permitted with each other.

Moreover, the speech recognition apparatus 150 comprises a speech inputting unit 155 for inputting an unknown speech signal into the CPU 152, a dictionary database 156 on which syllables of respective words for recognition are stored and a storage unit 157 on which the trained acoustic models 110 per syllable produced by the acoustic model producing apparatus 100 in the first embodiment are stored. The inputting unit 155, the dictionary database 155 and the storage unit 156 are electrically connected to the CPU bus 154 so that the CPU 152 can access from/to the inputting unit 155, the dictionary database 156 and the storage unit 157

In this embodiment, when inputting an unknown speech signal into the CPU 152 through the inputting unit 155, the CPU 152 executes operations of speech recognition with the inputted speech signal based on the program P1 according to a flowchart shown in FIG. 9.

That is, the CPU 152, at first, executes a speech analysis of the inputted speech signal by predetermined time length (frame) so as to extract k-order sequential characteristic parameters for each of the frames, these operations being similar to those in Step S32 in FIG. 2 so that the extracted characteristic parameters are equivalent to those in Step S32 (Step S61).

The CPU 152 performs a DP matching between the sequential characteristic parameters of the inputted unknown speech signal and the acoustic models 110 per syllable in accordance with the syllables stored on the dictionary database 156 (Step S62), so as to output words which have the most similarity in other words as speech recognition result (Step S63).

According to the speech recognition apparatus 150 performing the above operations, the acoustic models are trained by using the speech samples for training on which the noise samples determined by clustering the large number of noise samples are superimposed, making it possible to obtain a high recognition rate in any unknown environments.

Next, a result of speech recognition experiment by using the speech recognition apparatus 150 is explained hereinafter.

In order to prove the effects of the present invention, a speech recognition experiment was carried out by using the speech recognition apparatus 150 and the acoustic models obtained by the above embodiment. Incidentally, as valuation data, speech data of one hundred geographic names in 10 persons was used. Nose samples which were not used for training were superimposed on the valuation data so as to perform recognition experiment of the 100 words (100 geographic names). The noise samples for training corresponding to the noise samples $NL_1$~$NL_N$ (N=5) are "RIVER)", "MARK II", "DATA SHOW HALL", "OFFICE" and "KINDERGARTEN".

The noise samples to be superimposed on the valuation data were "MUSIC" in cluster 1, "MAJESTA" in cluster 2, "SUBWAY" in cluster 3, "OFFICE" in cluster 4 and "TOKYO STATION" in cluster 5. In addition, as unknown noise samples, a noise sample "ROAD" which was recoded at the side of a road, and a noise sample "TV CM" which is a recoded TV commercial were superimposed on the valuation data, respectively, so as to carry out the word recognition experiment.

Moreover, as a contrasting experiment, a word recognition experiment by using acoustic models trained by only one noise sample "MARK II" in cluster 2, corresponding to the above conventional speech recognition, was similarly carried out.

As the result of these experiments, the word recognition rates (%) are shown in Table 1.

TABLE 1

| TRAINING DATA NOISE | | | VALUATION DATA NOISE | | | | | | |
|---|---|---|---|---|---|---|---|---|---|
| | | | CLUSTER 1 | CLUSTER 2 | CLUSTER 3 | CLUSTER 4 | CLUSTER 5 TOKYO | UNKNOWN NOISE | |
| | | | MUSIC | MAJESTA | SUBWAY | OFFICE | STATION | ROAD | TV CM |
| CLUSTER 2 | MARK II | (A) | 48.2 | 94.8 | 88.8 | 76.7 | 77.7 | 92 | 58.2 |
| CLUSTER 1~5 | RIVER, MARK II, DATA SHOW HALL, OFFICE, KINDERGARTEN | (B) | 77.1 | 92.9 | 92.7 | 90.5 | 91.3 | 94 | 74.1 |

As shown in the Table 1, according to (A) which was trained by using only one noise sample MARK II in the cluster 2, in a case where the noise samples at the time of training and those at the time of recognition are the same, such as noise samples in both clusters 2, the high recognition rate, such as 94.8 (%) was obtained.

However, under noisy environments belonging to the clusters except for the cluster 2, the recognition rate was deteriorated.

On the contrary, according to (B) which was trained by using noise samples in all clusters 1~5, the recognition rates in the respective clusters except for the cluster 2, such as 77.1 (%) in the cluster 1, 92.7 (%) in the cluster 3, 90.5 (%) in the cluster 4, 91.3 (%) in the cluster 5 were obtained, which were higher than the recognition rates therein according to (A).

Furthermore, according to the experiments under the unknown noisy environments, the recognition rates with respect to the noise sample "ROAD" and "TV CM" in the present invention corresponding to (B) are higher than those in the conventional speech recognition corresponding to (A).

Therefore, in the present invention, it is clear that the high recognition rates are obtained in unknown noisy environments.

Incidentally, in the embodiment, the selected N noise samples are superimposed on the speech samples for training so as to train the untrained acoustic models whose states are single Gaussian distributions, but in the present invention, the states of the acoustic models may be mixture Gaussian distribution composed by N Gaussian distributions corresponding to the respective noise samples. Moreover, it may be possible to train the N acoustic models each representing single Gaussian distribution so that, when performing speech recognition, it may be possible to perform a matching operation between the trained N acoustic models and characteristic parameters corresponding to the inputted unknown speech signals so as to set a score to one of the acoustic models having the most similarity as a final score.

While there has been described what is at present considered to be the preferred embodiment and modifications of the present invention, it will be understood that various modifications which are not described yet may be made therein, and it is intended to cover in the appended claims all such modifications as fall within the true spirit and scope of the invention.

What is claimed is:

1. An apparatus for producing an acoustic model for speech recognition, said apparatus comprising:
   means for categorizing a plurality of first noise samples which can exist at the time of speech recognition into a plurality of clusters, a number of said clusters being smaller than that of noise samples;
   means for selecting a noise sample in each of the clusters to set the selected noise samples to second noise samples for training;
   means for storing thereon an untrained acoustic model for training; and
   means for training the untrained acoustic model by using the second noise samples for training so as to produce the acoustic model for speech recognition.

2. An apparatus for producing an acoustic model according to claim 1, wherein said categorizing means further comprises:
   means for executing a speech analysis of each of the first noise samples by frame to obtain characteristic parameters for each frame in each of the first noise samples;
   means for obtaining a time-average vector in each of the characteristic vectors of each of the first noise samples; and
   means for clustering the time-average vectors of the respective characteristic vectors into the clusters.

3. An apparatus for producing an acoustic model according to claim 2, wherein said clustering means performs the clustering operation by using a hierarchical clustering method.

4. An apparatus for producing an acoustic model according to claim 2, wherein said clustering means further comprises:
   means for setting the time-average vectors to clusters;
   means for computing each distance between each cluster;
   means for extracting at least one pair of two clusters in the set clusters, said at least one pair of clusters providing a distance which is shorter than any other paired two clusters in the set clusters;
   means for linking the two extracted clusters to set the linked clusters to a same cluster;
   means for determining whether or not a number of the clusters including the same cluster equals to one, said extracting means and linking means performing the extracting operation and the linking operation repeatedly in a case where the determination is that the number of clusters does not equal to one;
   means for producing, in a case where the determination is that the number of clusters equals to one, a dendrogram indicating a linking relationship between the linked clusters and indicating similarities among the first noise samples; and
   means for cutting the dendrogram at a predetermined position thereof to obtain plural clusters linked to each other,
   wherein said selecting means selects the noise sample in each of the obtained plural clusters.

5. An apparatus for producing an acoustic model according to claim 1, wherein said training means further comprises:
   means for storing thereon a plurality of speech samples for training;
   means for extracting at least one of the second noise samples for training;
   means for superimposing the at least one of extracted second noise sample on the speech samples for training;
   means for executing a speech analysis of each of the noise superimposed speech samples by frame to obtain characteristic parameters corresponding to the noise superimposed speech samples; and
   means for training the untrained acoustic model on the basis of the obtained characteristic parameters to obtain the acoustic model for speech recognition, said trained acoustic model being trained according to the at least one extracted noise sample.

6. An apparatus for recognizing an unknown speech signal comprising:
   means for categorizing a plurality of first noise samples which can exist at the time of speech recognition into a plurality of clusters, a number of said clusters being smaller than that of noise samples;
   means for selecting a noise sample in each of the clusters to set the selected noise samples to second noise samples for training;
   means for storing thereon an untrained acoustic model for training;
   means for training the untrained acoustic model by using the second noise samples for training so as to obtain a trained acoustic model for speech recognition;
   means for inputting the unknown speech signal; and
   means for recognizing the unknown speech signal on the basis of the trained acoustic model for speech recognition.

7. A programmed-computer readable storage medium comprising:
   means for causing a computer to categorize a plurality of first noise samples which can exist at the time of speech recognition into a plurality of clusters, a number of said clusters being smaller than that of noise samples;
   means for causing a computer to select a noise sample in each of the clusters to set the selected noise samples to second noise samples for training;
   means for causing a computer to store thereon an untrained acoustic model; and
   means for causing a computer to train the untrained acoustic model by using the second noise samples for training so as to produce an acoustic model for speech recognition.

8. A method of producing an acoustic model for speech recognition, said method comprising the steps of:
   preparing a plurality of first noise samples;
   preparing an untrained acoustic model for training;
   categorizing the plurality of first noise samples which can exist at the time of speech recognition into a plurality of clusters, a number of said clusters being smaller than that of noise samples;
   selecting a noise sample in each of the clusters to set the selected noise samples to second noise samples for training; and
   training the untrained acoustic model by using the second noise samples for training so as to produce the acoustic model for speech recognition.

* * * * *